(12) United States Patent
Stephens

(10) Patent No.: US 8,181,515 B2
(45) Date of Patent: May 22, 2012

(54) FLUID LEVEL INDICATOR STRIP

(76) Inventor: Colin Stephens, Abbotsford (CA)

(*) Notice: Subject to any disclaimer, the term of this patent is extended or adjusted under 35 U.S.C. 154(b) by 480 days.

(21) Appl. No.: 12/273,486

(22) Filed: Nov. 18, 2008

(65) Prior Publication Data

US 2010/0122575 A1    May 20, 2010

(51) Int. Cl.
    *G01F 23/00* (2006.01)
(52) U.S. Cl. ............... 73/301; 73/299; 73/290 R
(58) Field of Classification Search ......... 73/301, 73/299, 290 R, 290 B, 304 R
    See application file for complete search history.

(56) References Cited

U.S. PATENT DOCUMENTS

| | | | | |
|---|---|---|---|---|
| 3,511,090 A | * | 5/1970 | Ehrenfried et al. | 73/301 |
| 3,623,366 A | * | 11/1971 | Rowell, William | 73/301 |
| 3,653,262 A | * | 4/1972 | Ehrenfried et al. | 374/142 |
| 3,663,881 A | * | 5/1972 | Ehrenfried et al. | 318/663 |
| 3,753,200 A | * | 8/1973 | Niejadlik | 338/42 |
| 3,783,689 A | * | 1/1974 | Ehrenfried et al. | 3/301 |
| 3,792,407 A | * | 2/1974 | Ehrenfried et al. | 338/13 |
| 4,119,860 A | * | 10/1978 | Gooley | 250/577 |
| 5,325,716 A | * | 7/1994 | Hafner et al. | 73/301 |
| 5,705,747 A | * | 1/1998 | Bailey | 73/290 R |
| 5,744,945 A | * | 4/1998 | Hodge et al. | 324/71.6 |
| 5,910,188 A | * | 6/1999 | Resnick | 73/290 R |
| 6,186,001 B1 | * | 2/2001 | Baker | 73/304 C |
| 6,502,461 B2 | * | 1/2003 | Keller | 73/305 |
| 6,581,461 B1 | * | 6/2003 | Diaz | 340/619 |
| 6,619,118 B1 | * | 9/2003 | Keck | 73/304 C |
| 7,334,471 B2 | * | 2/2008 | Maatuk | 73/304 R |

* cited by examiner

*Primary Examiner* — Hezron E Williams
*Assistant Examiner* — Rodney T Frank
(74) *Attorney, Agent, or Firm* — Gordon Thomson

(57) ABSTRACT

A fluid level indicator strip measures the level of water in a closed receptacle containing a volume of fluid within an impermeable liner. The strip is a flexible, thin and impermeable elongate strip having a first pressure sensing part disposed vertically within the receptacle on the surface of an inside wall and a second visual display part disposed on the same wall outside surface. The first and second parts are connected by a third horizontal part. Each pressure sensor is electrically connected to a direct opposite and corresponding visual display. In one embodiment the pressure sensors are piezoresistive. In another embodiment the visual displays are LEDs.

4 Claims, 7 Drawing Sheets

Figure 7
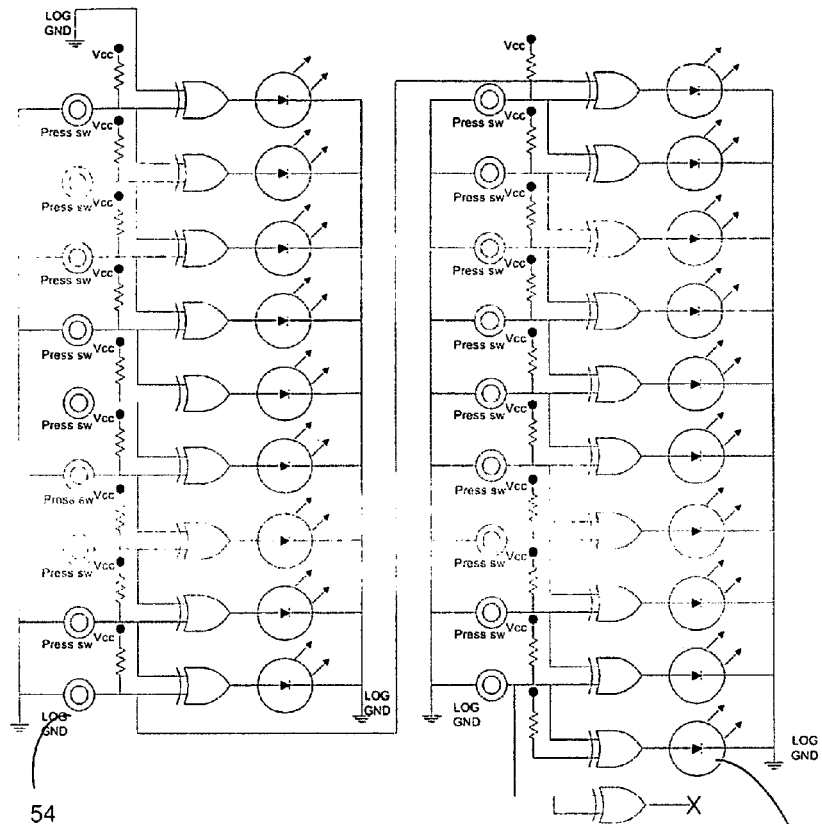
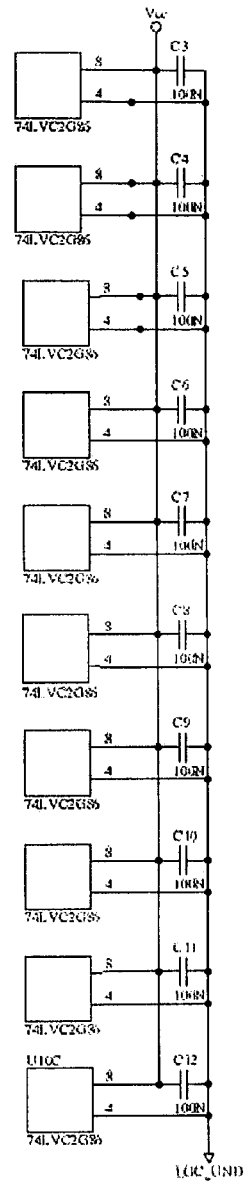
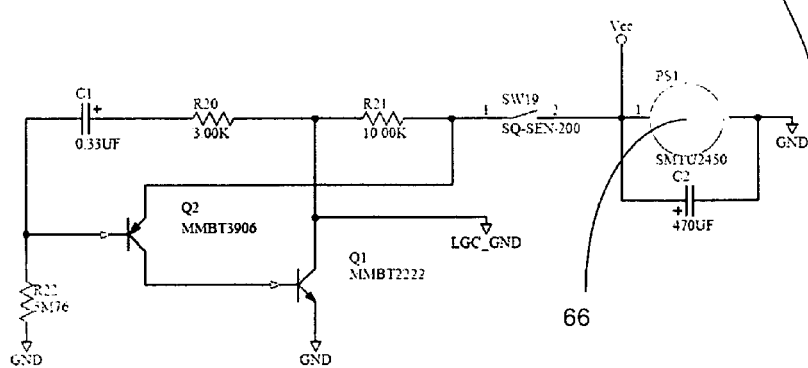

FLUID LEVEL INDICATOR STRIP

BACKGROUND OF THE INVENTION

1. Field of the Invention

This invention relates to apparatus for measuring the level of a fluid in a container and more particularly to a fluid level indicator strip.

2. Background Discussion

In food transportation applications it is important to maintain the integrity of the shipping receptacle to prevent contaminants from entering it. It is also important when shipping fluids in bulk that the level of fluid in the receptacle can be monitored. Known level indicators such as sight glasses are bulky, fragile and require holes drilled into the walls of the receptacle. This will compromise the seal of the receptacle. Other level indicators such as float-type fluid level indicators are mechanical and prone to breakdown. Furthermore, if the fluids are carried within a bladder or impermeable liner within the container, the ability to measure fluid levels in the receptacle becomes problematic.

Therefore there is a requirement to provide a fluid level indicator that can be used to indicate fluid levels within a sealed receptacle without the use of sight glasses and mechanical means.

SUMMARY OF THE INVENTION

To overcome deficiencies noted above the invention provided is a fluid level indicator strip for a receptacle containing a volume of fluid within an impermeable liner.

The strip is flexible, thin, impermeable and elongate. The strip is a single piece but can be described as having three parts that are contiguous. A first part of the strip houses a fluid level sensing means for disposition within the receptacle between the inside wall surface and the impermeable liner. A second part of the strip houses a fluid level display means for disposition outside of the receptacle. A third part of the strip connects the first inside part and the second part. The fluid level indicator strip is powered by power means such as a battery that electrically connects the fluid level sensing means to the fluid level display means.

The first part is disposed vertically on the inside surface of the receptacle. The second part is disposed vertically on the outside surface of the receptacle directly opposite the first part. The third part is disposed horizontally on the top surface of the wall and does not interfere with sealing of the receptacle.

In one embodiment of the invention the fluid level sensing means are pressure sensors.

In one embodiment of the invention the pressure sensors are piezoresistive and the visual displays may be light emitting diodes (LEDs). The visual displays can also be liquid crystal displays (LCDs).

In another embodiment of the invention the pressure sensors are electro-mechanical pressure sensors.

In one embodiment of the invention the strip comprises two layers of impermeable material fixed in a sandwiched fashion so that the level sensors and visual displays are inside of the strip. One side of the strip is adhesive so that it can be removeably attached to the inside and outside walls of a receptacle.

In another embodiment of the invention for each pressure sensor there is a corresponding and opposite visual display electrically connected to it. As the water level actuates a pressure switch the corresponding opposite visual display is activated. For example, the corresponding LED is illuminated to display the fluid level within the receptacle outside the receptacle.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 7 is a schematic diagram of the circuit of one embodiment of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

Figure 1:
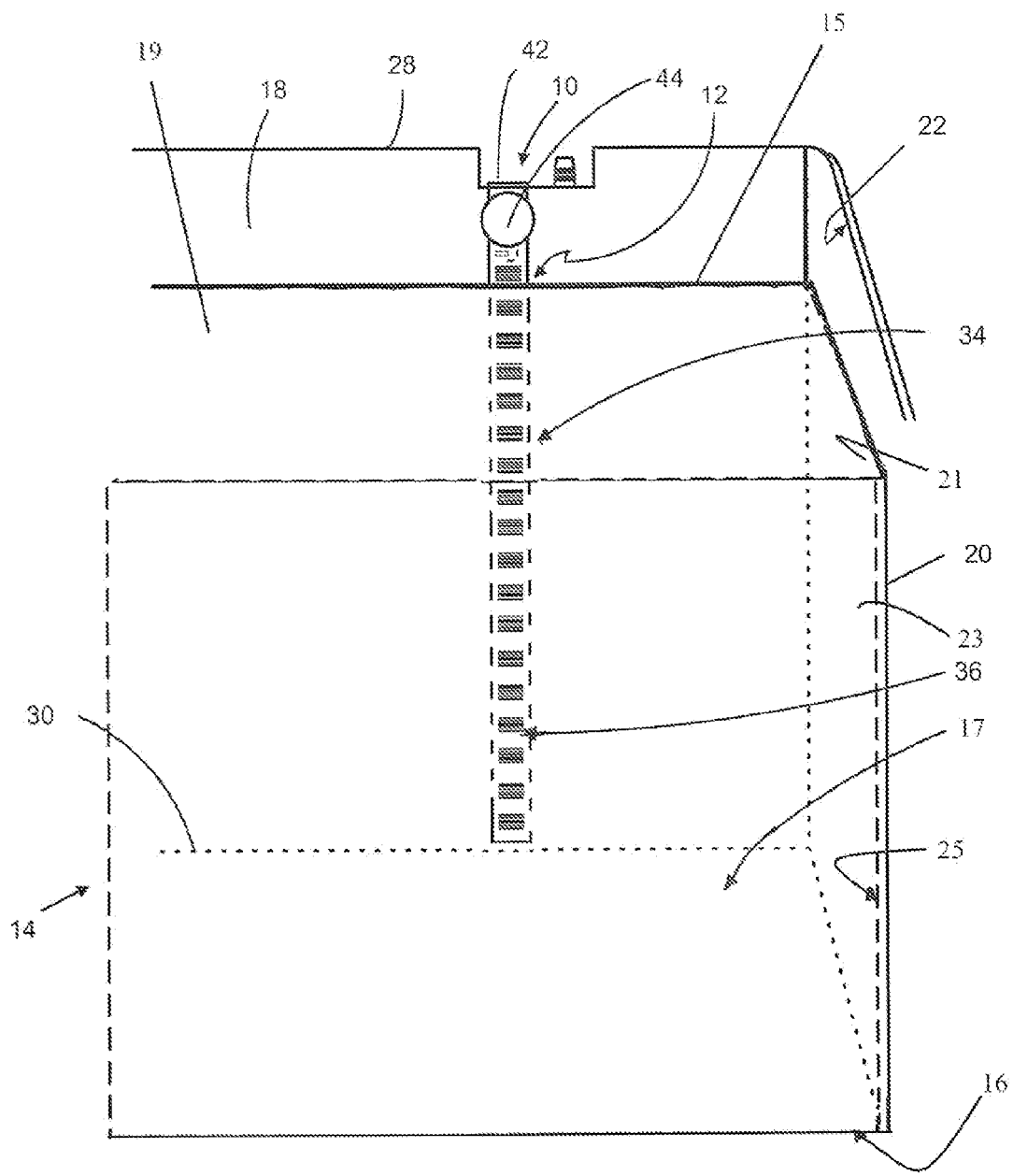
FIG. 1 is a partial diagram of the inside of a receptacle showing pressure sensing means of one embodiment of the invention.
Figure 2:
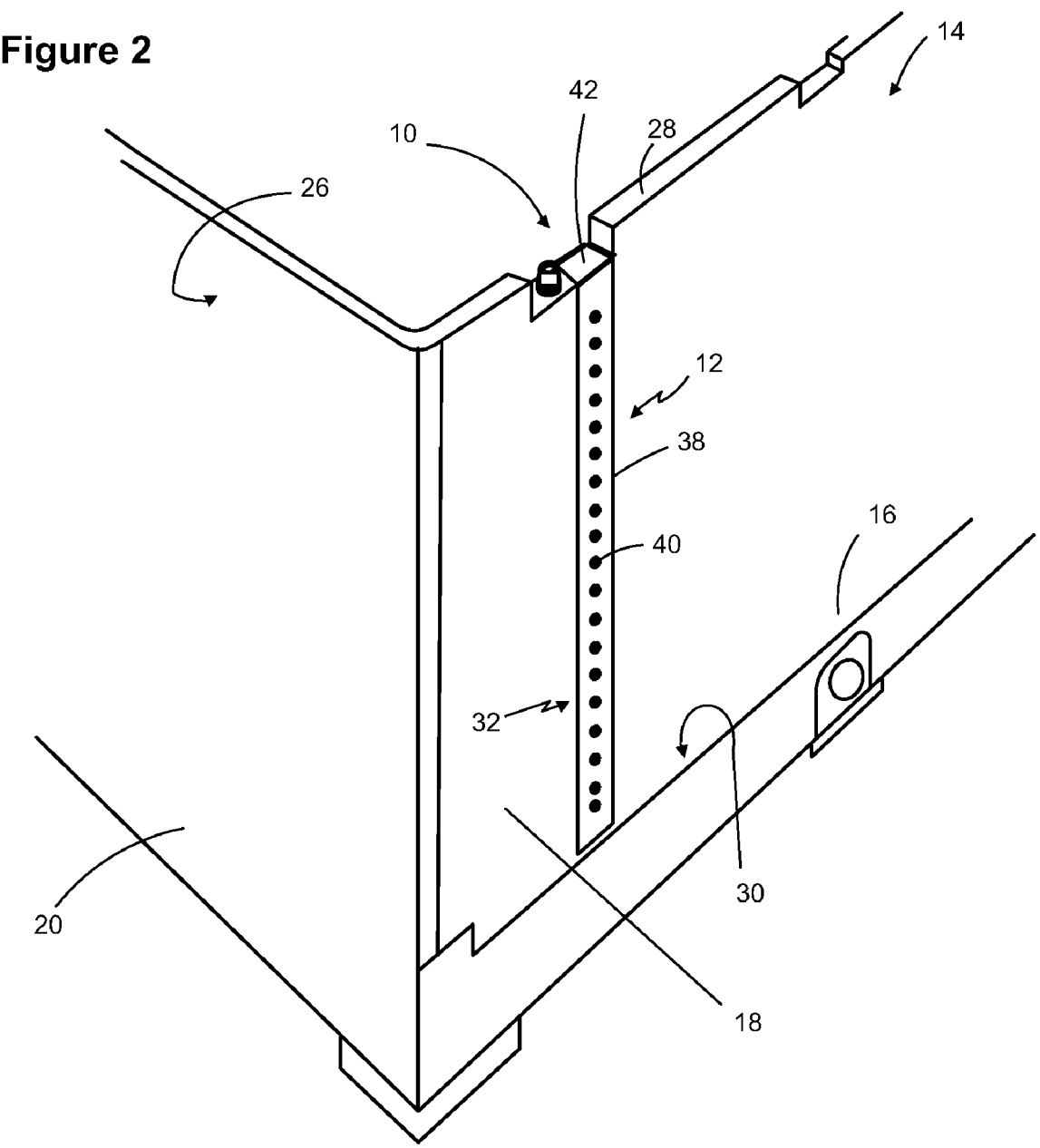
FIG. 2 is a partial diagram of the outside of a receptacle showing visual display means of one embodiment of the invention.

Referring now to FIGS. 1 and 2 there is shown one embodiment of the invention 10 being a fluid level indicator strip 12 for a receptacle 14 containing a volume of fluid within an impermeable liner 15. The receptacle is illustrated as a cut-away to show the impermeable liner 15 and comprises a bottom surface 16 and four walls (of which two are shown here 18, 20). Each of the walls has an inside surface 22, an outside surface 26, a top end 28 and a bottom end 30. There is also a removable top which is not illustrated. The impermeable liner 15 comprises a bottom surface 17 and four walls (of which three are shown 19, 21, 23). Solid line 20 illustrates a wall of the receptacle 14 and dashed line 25 shows the adjacent wall of the liner 15.

The fluid level indicator strip 12 comprises a flexible thin impermeable elongate strip 32. The strip has a first part 34 that houses fluid level sensing means 36. The first part is disposed within the receptacle 14 between the inside 22 surface of the wall 18 and the adjacent wall 19 of the liner 15. There is also a second part 38 that houses a fluid level display means 40. The second part is disposed outside of the receptacle 14. There is also a third part 42 that connects the first part 34 and the second part 38. Power means 44 is provided for electrically connecting the Fluid level sensing means 36 to the fluid level display means 40.

Referring to FIG. 1, there is illustrated the first part 34 disposed vertically on the inside surface 22 of one of the four walls 18. The invention can be disposed on any one of the four walls of the receptacle. The first part 34 is illustrated in a broken line because it lies behind liner 15.

Referring to FIG. 2, there is illustrated the second part 38 disposed opposite the first part 34 vertically on the outside surface 26 of the wall 18. The third connecting part 42 is disposed horizontally on the top surface 24 of wall 18 so that when the cover is placed on the receptacle and secured in place the third part does not interfere with the seal of the receptacle.

Referring to FIG. 1, the impermeable liner 15 contains the volume of fluid and it is to be understood that the first part 34 is placed between the liner and the inside surface 22 of wall 18.

Figure 3:
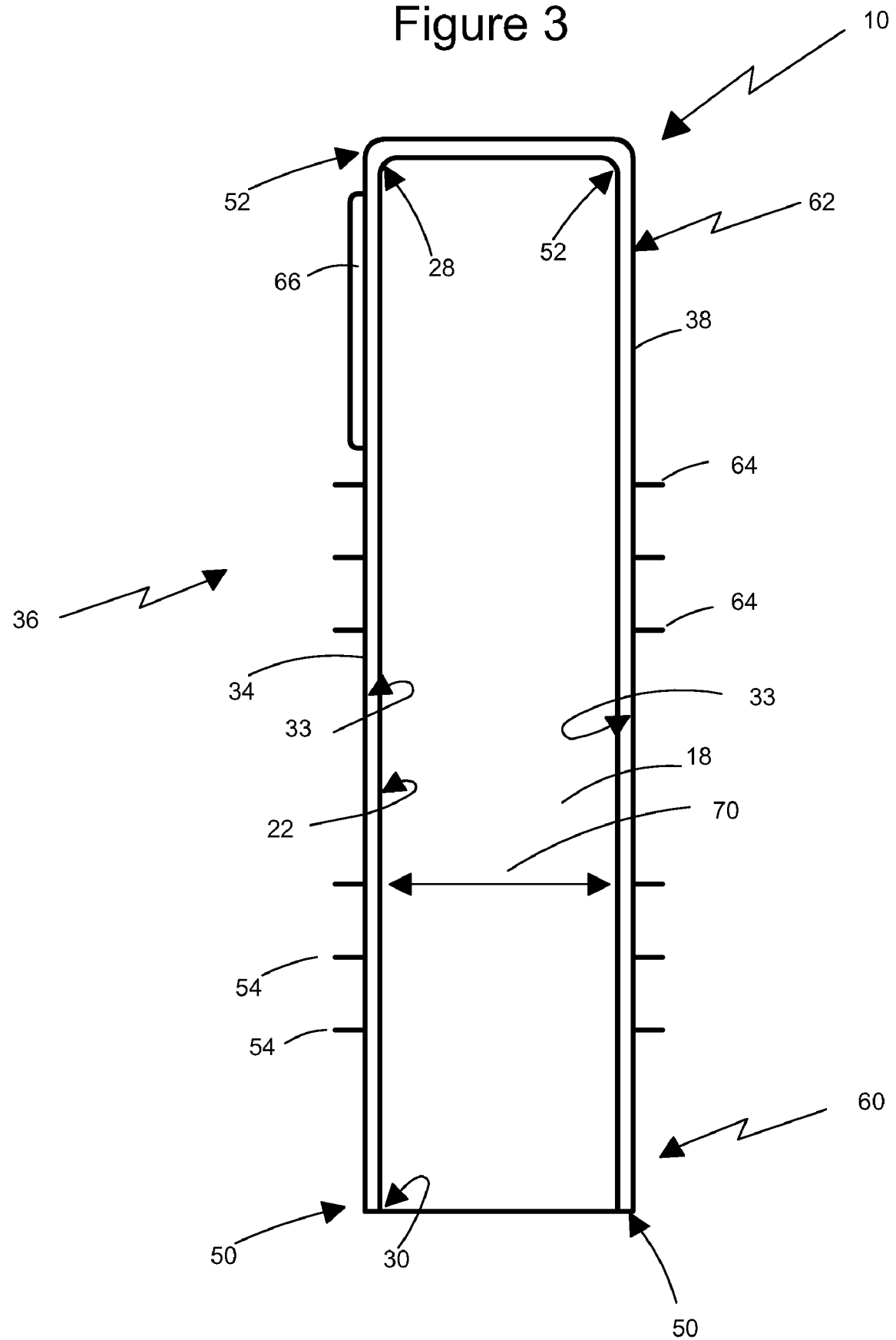
FIG. 3 is a cross-sectional diagram of a wall of a receptacle showing one embodiment of the invention.

Referring to FIG. 3, there is shown in cross-section wall 18 with a cross-section of the invention 10. The first part 34 has a bottom end 50 and a top end 52. The bottom end 50 of the first part 34 is disposed adjacent to the bottom end 30 of the inside surface 22 of wall 18. The top end 52 of the first part 34 is disposed adjacent to the top end 28 of the wall 18 inside surface 22.

The fluid level indicator strip 12 level sensing means 36 comprises a series of spaced apart fluid level sensors 54.

In one embodiment of the invention the fluid level sensors are pressure sensors arranged serially in a vertical column. There are typically a predetermined number of pressure sensors on the fluid level indicator strip to accommodate the height of the receptacle and the necessary graduation of fluid depth measurement within the receptacle.

In one embodiment of the invention the pressure sensors are piezoresistive. In another embodiment of the invention the pressure sensors are electromechanical. Other types of suitable pressure sensors can be used.

The fluid indicator strip 12 is a flexible, thin and impermeable elongate strip comprising a first impermeable layer fixed over a second impermeable layer. The fluid level sensing means and the fluid level display means are sandwiched between the first and said second impermeable layers. The inside surface of the strip 33 is adhesive so that the first part can be removeably fixed to a receptacle wall inside surface and the second part can be removeably fixed to the opposite receptacle wall outside surface.

The fluid level indicator strip 12 second part 38 has a bottom end 60 and a top end 62. The second part bottom end 60 is disposed opposite the first part bottom end 50. The second part top end 62 is disposed opposite the first part top end 52.

Referring to FIG. 2 and FIG. 3, the fluid level display means 40 comprises a series of spaced apart visual displays 64. The visual displays are disposed in a column and there are an equal number of visual displays as there are pressure sensors.

In one embodiment of the invention the visual displays are LEDs. The visual displays may also be LCDs with suitable low power consumption.

For each one of the pressure sensors there is a corresponding opposite visual display electrically connected to it so that as each of the pressure sensors is activated, the corresponding opposite visual display is activated resulting in the display of fluid level within the receptacle outside the receptacle. This is shown by arrow 70 in FIG. 3.

Power means is a battery 66 disposed proximate to the top end of the second part of the indicator strip.

Figure 4:
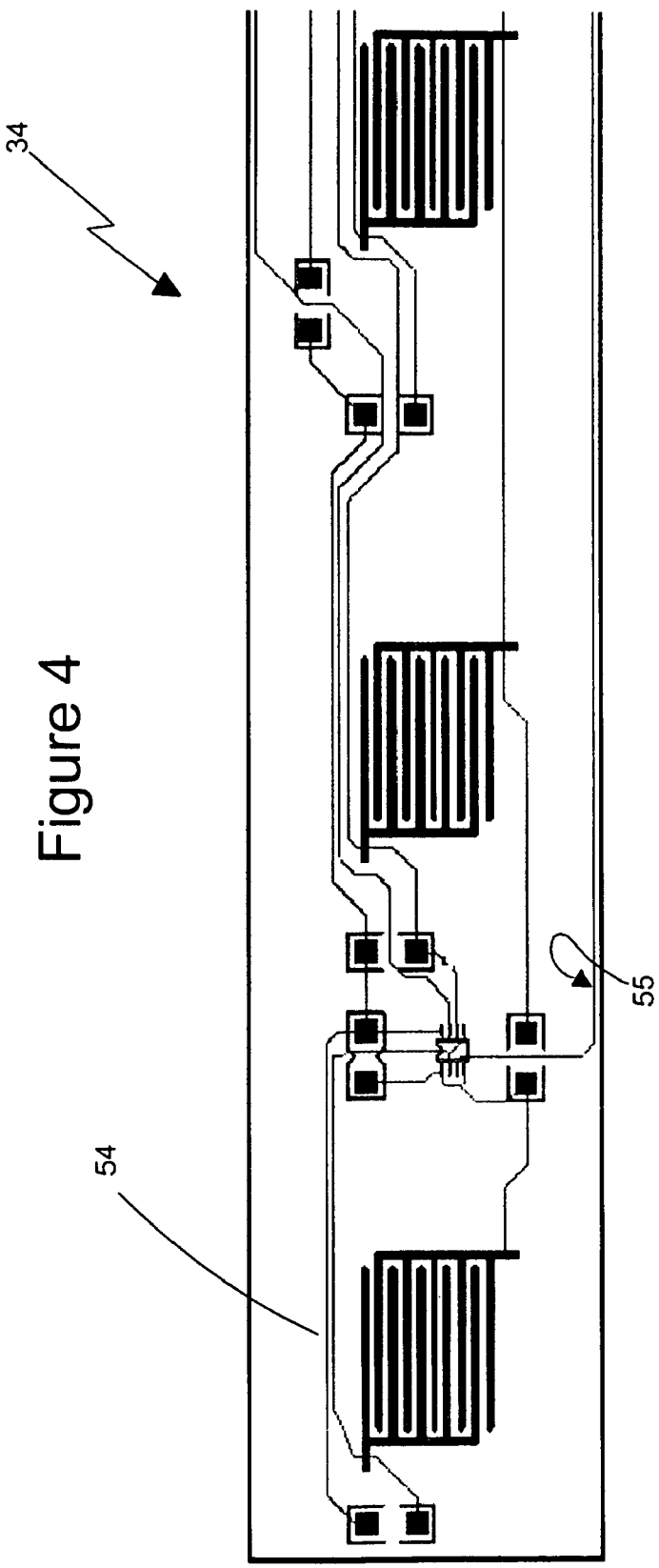
FIG. 4 is a partial circuit diagram of one embodiment of the invention showing pressure switches.

Referring to FIG. 4, there is shown a partial schematic diagram of the fluid level indicator strip 12 first part 34 illustrating the circuits of three of the pressure sensors 54. Each of the pressure switches 54 are connected electrically 55 to its corresponding visual display shown on FIG. 5.

Figure 5:
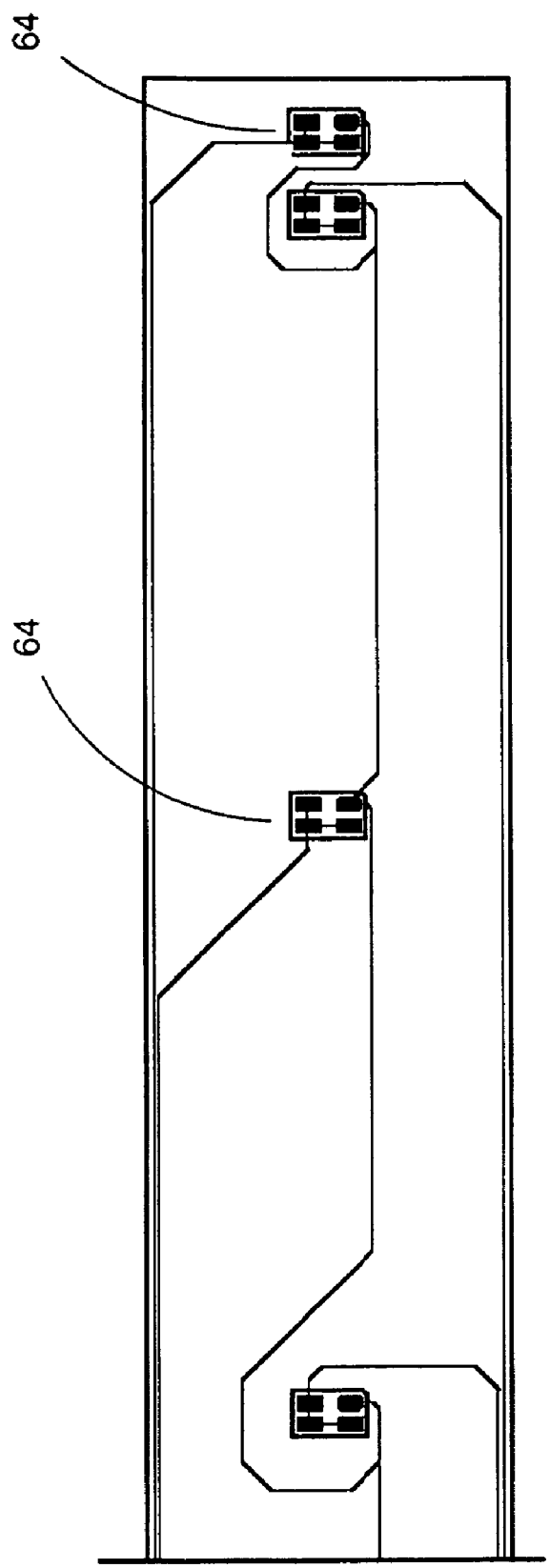
FIG. 5 is a partial circuit diagram of one embodiment of the invention showing visual displays.

Referring to FIG. 5, there is shown a partial schematic diagram of the fluid indicator strip 12 second part 38 illustrating the visual displays 64. In the embodiment shown in FIG. 5, pressure switch SW1 is connected to display L1. SW1 is located at the bottom of the first part and correspondents to L1 located at the bottom of the second part. When SW1 is activated by pressure from the liner L1 will illuminate.

Figure 6:
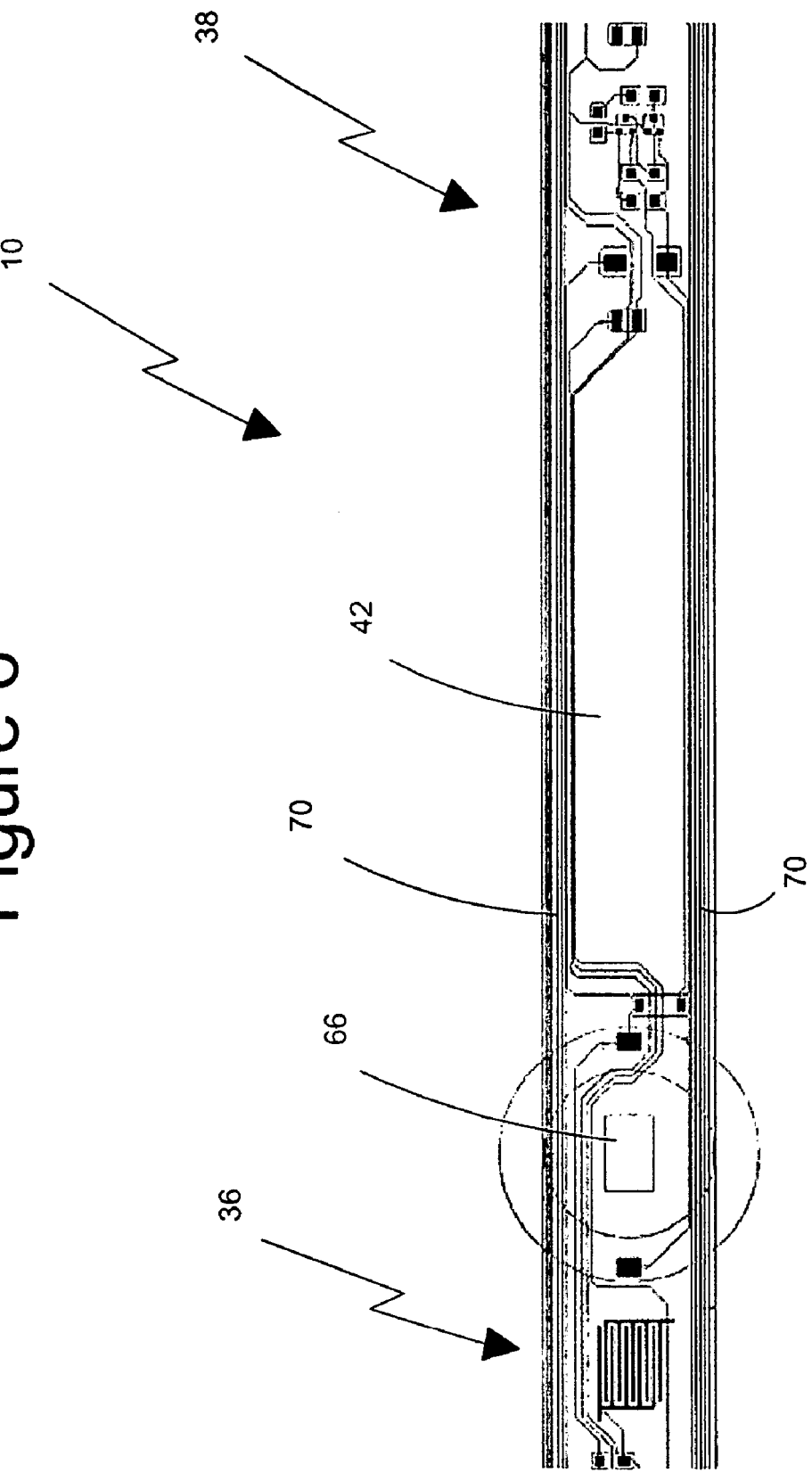
FIG. 6 is a partial circuit diagram of one embodiment of the invention showing the third part and the connection between the first and second parts of the invention.

Referring to FIG. 6, there is illustrated a partial schematic diagram of the invention 10 third part 42 connecting first part 36 to second part 38. The electrical connections 70 between the pressure switches and the visual displays are also shown running through the third part. Battery 66 is shown disposed at the top end of the first part.

Referring to FIG. 7, there is illustrated a schematic diagram of the electronic layout of one embodiment of the invention showing the pressure switches 54 and their operative relationship to the visual displays 64. The battery 66 circuit is also shown While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A fluid level indicator strip for a receptacle containing a volume of fluid within an impermeable liner, said receptacle comprising a bottom surface, four walls each having an inside surface, a top surface, an outside surface, a top end and a bottom end and a removable top, wherein said fluid level indicator strip comprises a flexible thin impermeable elongate strip having:
   a. a vertically disposed first part housing a predetermined number of spaced apart fluid level sensors disposed in a column within the receptacle between said wall inside surface and said impermeable liner so that said volume of fluid is not in contact with said fluid level indicator;
   b. a vertically disposed second part housing a predetermined number of visual fluid level displays disposed on said wall outside surface opposite said first part;
   c. a third part connecting said first part to said second part disposed horizontally on said top surface; and,
   d. a power source connected to the fluid level indicator strip.

2. The fluid indicator strip of claim 1, wherein said flexible thin impermeable elongate strip comprises a first impermeable layer fixed over a second impermeable layer and wherein the predetermined number of spaced apart fluid level sensors and said predetermined number of visual fluid level displays are sandwiched between said first and said second impermeable layers.

3. The fluid indicator strip of claim 1 further comprising one adhesive surface so that the first part can be temporarily fixed to the receptacle wall inside surface, so that the second part can be temporarily fixed to the receptacle wall opposite outside surface and so that the third part can be temporarily fixed to the wall top surface.

4. The fluid level indicator strip of claim 1, wherein each of the predetermined number of spaced apart fluid level sensors is disposed opposite one of the predetermined number of visual fluid level displays and electronically connected thereto so that as each of the predetermined number of spaced apart fluid sensors is activated the corresponding opposite visual fluid level display is activated resulting in the display of fluid level within the receptacle outside the receptacle.

* * * * *